(12) United States Patent
Plehiers et al.

(10) Patent No.: US 8,129,028 B2
(45) Date of Patent: Mar. 6, 2012

(54) PAINT COMPOSITION

(75) Inventors: Mark Plehiers, Bruxelles (BE); Sander Van Loon, Amsterdam (NL); Jacques Courtin, Leiderdorp (NL); Sijmen Visser, Marken (NL)

(73) Assignee: PPG B.V., Uithoorn (NL)

( * ) Notice: Subject to any disclaimer, the term of this patent is extended or adjusted under 35 U.S.C. 154(b) by 100 days.

(21) Appl. No.: 12/307,227

(22) PCT Filed: Jul. 3, 2007

(86) PCT No.: PCT/EP2007/056672
§ 371 (c)(1),
(2), (4) Date: Apr. 27, 2009

(87) PCT Pub. No.: WO2008/003695
PCT Pub. Date: Jan. 10, 2008

(65) Prior Publication Data
US 2009/0318612 A1    Dec. 24, 2009

(30) Foreign Application Priority Data
Jul. 4, 2006    (EP) .................................... 06013785

(51) Int. Cl.
B32B 9/04 (2006.01)
(52) U.S. Cl. ............... 428/447; 106/286.6; 106/287.11; 106/287.13; 106/287.15; 106/287.16
(58) Field of Classification Search .................. None
See application file for complete search history.

(56) References Cited

U.S. PATENT DOCUMENTS

| | | | |
|---|---|---|---|
| 3,320,082 A | 5/1967 | McMahon et al. | |
| 5,322,888 A * | 6/1994 | Kato et al. | 524/783 |
| 5,789,476 A * | 8/1998 | Iryo et al. | 524/430 |
| 5,958,514 A | 9/1999 | Havey et al. | |
| 6,001,163 A | 12/1999 | Havey et al. | |
| 6,001,164 A * | 12/1999 | Watanabe et al. | 106/287.13 |
| 6,346,331 B2 | 2/2002 | Harvey et al. | |
| 6,538,092 B1 * | 3/2003 | Terry et al. | 528/26 |
| 6,699,316 B2 * | 3/2004 | Marx et al. | 106/425 |
| 6,719,836 B2 | 4/2004 | Nederlof et al. | |
| 2001/0049023 A1 | 12/2001 | Havey et al. | |
| 2002/0056400 A1 | 5/2002 | Nederlof et al. | |
| 2002/0102417 A1 | 8/2002 | Schutt et al. | |
| 2004/0047996 A1 | 3/2004 | Hovius et al. | |
| 2005/0031790 A1 | 2/2005 | Jackson et al. | |
| 2006/0275627 A1 * | 12/2006 | Biteau et al. | 428/817 |
| 2008/0167425 A1 | 7/2008 | Tominaga et al. | |
| 2009/0011256 A1 * | 1/2009 | Ito et al. | 428/447 |
| 2009/0087573 A1 * | 4/2009 | Saito et al. | 427/421.1 |
| 2011/0098397 A1 | 4/2011 | Plehiers et al. | |

FOREIGN PATENT DOCUMENTS

| | | |
|---|---|---|
| CN | 1257531 | 6/2000 |
| EP | 0931820 A1 | 7/1999 |
| EP | 1191074 A1 | 3/2002 |
| EP | 1191075 A1 | 3/2002 |
| EP | 1760115 | 3/2007 |
| JP | 53016044 | 2/1978 |
| JP | 03079675 | 4/1991 |
| JP | 2002/105401 | 4/2002 |
| JP | 2004/521988 | 7/2004 |
| JP | 2005/510584 | 4/2005 |
| JP | 2006/28372 | 2/2006 |
| JP | 2008/528741 | 7/2008 |
| WO | WO 88/06177 | 8/1988 |
| WO | WO 98/13544 | 4/1998 |
| WO | WO 98/46692 | 10/1998 |
| WO | WO 02/100151 | 12/2002 |
| WO | WO 03/022940 | 3/2003 |
| WO | WO 2005/123838 | 12/2005 |
| WO | WO 2006/079516 | 8/2006 |

OTHER PUBLICATIONS

JP 60238080 A (Nippon Tainetsu, Nov. 26, 1985 (Abstract) (XP-002400697].
JP 51106134 A (Dainippon Toryo KK), Sep. 20, 1976 (Abstract) XP-002400698].
International Search Report on corresponding to PCT application No. PCT/EP2007/056672 Filed Jul. 3, 2007.

* cited by examiner

*Primary Examiner* — Marc Zimmer
(74) *Attorney, Agent, or Firm* — Goodwin Procter LLP

(57) ABSTRACT

A two component paint composition that, after mixing, comprises the following components in aqueous solution: a) from the first component: i) an aqueous binder, which aqueous binder comprises an oligomeric or polymeric compound the oligomeric or polymeric compound being formed from at least one monomer of the general formula I: $Si(OR^1)_4$ where each $R^1$ is independently selected from hydrogen or any alkyl, alkenyl, alkynyl, aralkyl, aryl or —(C═(O)R^4 group, and each $R^4$ group is independently selected from hydrogen or any alkyl, alkenyl, alkynyl, aralkyl or aryl group, and at least one monomer having the general formula II: $(R^2)_{4-m}Si(OR^3)_m$ where each $R^2$ is independently selected from hydrogen or any alkyl, alkenyl, alkynyl, aralkyl or aryl group, and wherein at least one —$R^2$ group comprises the group —$R^X R^Z$ or —$R^X N(R^W)_2$ where $R^X$ is any $C_1$ to $C_{10}$ bivalent organic bridging group, Q is selected from an Oxygen or a Sulphur radical and $R^Z$ comprises an H, alkyl, alkenyl, alkynyl, aralkyl or aryl group, and each $R^W$ is independently selected and defined as for $R^Z$ above; where each $R^3$ is independently selected from hydrogen or any alkyl, alkenyl, alkynyl, aralkyl, aryl or —(C═O)R^5 group, where $R^5$ is defined as for $R^4$ above, and m=1 to 3; and, optionally at least one colloidal silica; b) from the second component i) at least one reactive filler material.

15 Claims, No Drawings

PAINT COMPOSITION

CROSS-REFERENCE TO RELATED APPLICATIONS

This application claims the benefit of priority to EP 06013785.8 filed on Jul. 4, 2006, and is the national phase of PCT/EP2007/056672 filed on Jul. 3, 2007 which published in English on Jan. 10, 2008 as WO 2008/003695 A1, the contents of each are hereby incorporated by reference herein in the entirety.

The present invention relates to a paint composition, particularly to an aqueous paint composition.

Paint compositions may be used to coat various surfaces and for various reasons such as protection and/or decoration. As a result the surface is covered with a dried layer which often is referred to as a paint layer, but more correctly referred to as coating layer. Paint compositions may be broadly considered as comprising three ingredients: a binder, a solvent and a pigment. The binder, in general terms, is a film forming component which, together with the solvent, forms the vehicle for delivery of the pigment to a chosen substrate. It is universally accepted in the art that the choice of binder in a paint, as with many other coating compositions can determine many of the properties of the paint.

Decorative paints, may be solvent based or water-based; in this latter case, water-based silane and silicon emulsions are used to protect outdoor surfaces such as concrete or facades from rain water and atmospheric damage. Paints that are used for these purposes include long lasting water repellent paints, dirt repellent paints, anti-graffiti paints and the like.

Anti-corrosion paints are used in a wide variety of applications to protect the substrates from corrosion. One such paint is a so called shop primer. A shop primer or pre-construction primer is usually administered as a thin layer of protective coating to a substrate. For example, hot rolled steel for the heavy steel construction industry (such as the ship building industry) is generally blasted on-line using automated procedures and immediately coated with a thin layer of shop primer.

An effective shop primer should possess the following qualities:
Have an adequate shelf life and pot life;
Be easily sprayable, particularly in thin layers;
Be physically dry to handle at the end of the spraying procedure;
Offer good corrosion protection to the substrate;
Offer good mechanical resistance;
Not interfere with the welding and cutting operations which the substrate may be subject to;
Withstand the heat and stress of the welding and cutting operations that the substrate may be subject to;
Not introduce health hazards during welding operations such as the release of noxious fumes etc.;
Offer comparability to further coatings which may be applied on top thereof, referred to as "overcoatability".

One type of binder known in the art is a silicate type binder. For example, EP-A-346385 discloses a paint composition comprising a silicate based binder, but requires the use of volatile solvents. Generally, from an environmental perspective, the use of volatile solvents in paint compositions should be avoided.

EP-A-1191075 discloses a water soluble shop primer composition having a binder comprising the reaction products of at least one omega-aminoalkyl trialkoxysilane, at least one strong acid and at least one compound having a trialkoxy or alkyldialkoxy silane and an epoxy group as terminal groups. This binder is used in a first component of a two component system, the second component comprising finely divided zinc as an anti-corrosive agent.

Although the use of these known binders allows the composition to be water based and thus avoid the use of volatile solvents, it has been found that such primers nave poor long term performance and are susceptible to blistering after the shop primer is overcoated with a paint system suitable for immersion service and immersed in water. This is a significant problem for the ship building industry.

It is one of the objects of embodiments of the present invention to address the above mentioned problems and provide a paint composition which contains few or no volatile solvents and minimizes the occurrence of blistering when overcoated and immersed in water.

According to a first aspect of the present invention, there is provided a two component paint composition that, after mixing, comprises the following components in aqueous solution:
a) front the first component:
i) an aqueous binder, which aqueous binder Comprises an oligomeric or polymeric compound the oligomeric or polymeric compound being formed from at least one monomer of the general formula I:

$$Si(OR^1)_4 \qquad \qquad I$$

where each $R^1$ is independently selected from hydrogen or any alkyl, alkenyl, alkynyl, aralkyl, aryl or —(C=O)$R^4$ group, and
each $R^4$ group is independently selected from hydrogen or any alkyl, alkenyl, alkynyl, aralkyl or aryl group, and at least one monomer having the general formula II:

$$(R^2)_{4-m}Si(OR^3)_m \qquad \qquad II$$

where each $R^2$ is independently selected from hydrogen or any alkyl, alkenyl, alkynyl, aralkyl or aryl group, and wherein at least one —$R^2$ group comprises the group —$R^XQR^Z$ or —$R^XN(R^W)_2$ where $R^X$ is any $C_1$ to $C_{10}$ bivalent organic bridging group, Q is selected from an Oxygen or a Sulphur radical and $R^Z$ comprises an H, alkyl, alkenyl, alkynyl, aralkyl or aryl group, and each $R^W$ is independently selected and defined as for $R^Z$ above;
where each $R^3$ is independently selected from hydrogen or any alkyl, alkenyl, alkynyl, aralkyl, aryl or —(C=O)$R^5$ group, where $R^5$ is defined as for $R^4$ above,
and m=1 to 3;
and, optionally at least one colloidal silica;
b) from the second component
i) at least one reactive filler material.

Preferably, the paint composition is an anti-corrosion paint composition, more particularly an anti-corrosion primer paint composition. Preferably, the paint composition is an aqueous paint composition.

Preferably, the paint composition is a decorative paint composition. More preferably, the paint composition is a protective paint composition. Alternatively, the paint composition is a water repellent impregnation agent composition, preferably for textile or wall use.

Advantageously, a paint composition in accordance with the first aspect is stable, water soluble and does not require the presence of polar organic solvents to achieve sufficient stability.

Preferably, the paint comprises less than 20% (by weight on total paint) of organic solvent, more preferably, less than 10% and most preferably, less than 5%.

Examples of suitable reactive fillers include, but are not restricted to one or more of the following: iron oxides (including micaceous iron oxide); natural and precipitated barium sulphate, barytes, blanc fixe; aluminium silicate, kaolin, kaolinite, china clay; magnesium silicate and magnesium hydrosilicate, mica, talc, chlorite, tremolite; silica, surface treated silica, amorphous quartz, crystalline quartz, fumed silica; aluminium oxide and hydrate, bauxite, calcined bauxite; calcium magnesium carbonate, dolomite; natural and precipitated calcium carbonate; aluminium silicates, feldspar; nepheline syenite; calcium silicates, wollastonite; zinc oxide; zinc phosphate; graphite; bismuth vanadate; lead chromate; silicium carbide; zeolites; pyrophyllite; glass flakes; iron phosphide; nickel phosphide; hollow spheres; and aluminium. Also possible are natural fibers and other families of sulphates, carbonates, silicates, oxides and vanadates.

Preferably, the reactive filler is an alkaline filler. For example, the reactive filler has a pH greater than 7 according to method ISO 787/9 or ASTM D821.

Preferably, the reactive filler should react spontaneously; in an acid-base or a redox reaction, preferably at temperatures ranging from 0-40° C., more preferably 10-25° C.; with any material included in the first component.

Preferably, the first component comprises water. Preferably, the first component has a pH less than 7 according to method ISO 787/9 or ASTM D821. Thus, preferably, the oligomeric or polymeric compound is an acidic water based compound.

Preferably, the first component comprises less than about 10% organic solvents, more preferably, less than about 5% organic solvents, more preferably, less than 3% organic solvents and most preferably, less than about 1% organic solvents.

Preferably, the reactive filler comprises any mineral filler which contains an alkaline ion, such as, for example calcium, sodium, magnesium, potassium, manganese or iron.

Further examples of suitable reactive fillers include but are not restricted to one or more of the following: calcium carbonate, Tremolitic talc, talc, wollastonite, Barite, Diatomite, Feldspar, Pyrophyllite, Nepheline Syenite, Dolomite, cristobalite, muscovite, phlogopite, alunite, bentonite, carbonatites, clays, corundum, fluorspar, fuller's earth, gypsum, mica, olivine, perlite, quartz, silica sand, vermiculite, zeolites, zinc oxide and aluminium oxide.

Preferably, the at least one reactive filler is present in the paint composition in an amount ranging from 1% to 99% (by weight), more preferably ranging from 5% to 60%

Preferably, the oligomeric or polymeric compound is formed from at least two monomers of the general formula II.

Preferably, the polymeric or oligomeric substance is formed from at least one monomer of the general formula II and at least one colloidal silica.

In a preferred embodiment, the oligomeric or polymeric compound is formed from at least one monomer of the general formula I:

$$Si(OR^1)_4 \quad \text{I}$$

where each $R^3$ is independently selected from hydrogen or any alkyl, alkenyl, alkynyl, aralkyl, aryl or —(C=O)R$^4$ group, and
each $R^4$ group is independently selected from hydrogen or any alkyl, alkenyl, alkynyl, aralkyl or aryl group,
and, optionally at least one colloidal silica;
and at least one monomer having the general formula II:

$$(R^2)_{4-m}Si(OR^3)_m \quad \text{II}$$

where each $R^2$ is independently selected from hydrogen or any alkyl, alkenyl, alkynyl, aralkyl or aryl group, and wherein at least one —R$^2$ group comprises the group —R$^X$QR$^Z$ or —R$^X$N(R$^W$)$_2$ where R$^X$ is any $C_1$ to $C_{10}$ bivalent organic bridging group, Q is selected from an Oxygen or a Sulphur radical and R$^X$ comprises an H, alkyl, alkenyl, alkynyl, aralkyl or aryl group, and each R$^W$ is independently selected and defined as for R$^2$ above;
where each $R^3$ is independently selected from hydrogen or any alkyl, alkenyl, alkynyl, aralkyl, aryl or —(C=O)R$^5$ group, where R$^5$ is defined as for R$^4$ above,
and m=1 to 3.

Therefore, according to a second aspect of the present invention there is provided a paint composition comprising an aqueous binder, which aqueous binder comprises an oligomeric or polymeric compound the oligomeric or polymeric compound being formed from at least one monomer of the general formula I:

$$Si(OR^1)_4 \quad \text{I}$$

where each $R^1$ is independently selected from hydrogen or any alkyl, alkenyl, alkynyl, aralkyl, aryl or —(C=O)R$^4$ group, and
each $R^4$ group is independently selected from hydrogen or any alkyl, alkenyl, alkynyl, aralkyl or aryl group,
and, optionally at least one colloidal silica;
and at least one monomer having the general formula II:

$$(R^2)_{4-m}Si(OR^3)_m \quad \text{II}$$

where each $R^2$ is independently selected from hydrogen or any alkyl, alkenyl, alkynyl, aralkyl or aryl group, and wherein at least one —R$^2$ group comprises the group —R$^X$QR$^Z$ or —R$^X$N(R$^W$)$_2$ where R$^X$ is any $C_1$ to $C_{10}$ bivalent organic bridging group, Q is selected from an Oxygen or a Sulphur radical and R$^Z$ comprises an H, alkyl, alkenyl, alkynyl, aralkyl or aryl group, and each R$^W$ is independently selected and defined as for R$^Z$ above;
where each $R^3$ is independently selected from hydrogen or any alkyl, alkenyl, alkynyl, aralkyl, aryl or —(C=O)R$^5$ group, where R$^5$ is defined as for R$^4$ above,
and m=1 to 3; and
the paint composition further comprising at least one reactive filler material.

Preferably, the ratio (by weight) of the at least one monomer of general formula I:the at least one monomer of general formula II is in the range 1-99:99-1. More preferably, the ratio (by weight) of the at least one monomer of general formula I:the at least one monomer of general formula II is in the range 51-99:49-1

Preferably, the ratio (by weight) of monomer I:II is in the range 51-95:49-5. Preferably, the ratio (by weight) of monomer I:II is in the range 51-85:49-15. Preferably, the ratio (by weight) of monomer I:II is in the range 51-75:49-25. Preferably, the ratio (by weight) of monomer I:II is in the range 51-66:49-34. Preferably, the ratio (by weight) of monomer I:II is in the range 55-65:45-35. Most preferably, the ratio (by weight) of monomer I:II is about 60:40.

During the polymerization process, monomers of general formula I (when present), colloidal silicas (when present) and monomers of general formula II polymerize i.e. the hydrocarbyloxy or acetoxy silanes hydrolyse and the formed silanols condense and alkanols are released. The alkanols may be separated, usually distilled out of the reaction mixture to leave the oligomeric or polymeric product generally with a [—O—Si—O—Si—] backbone. Accordingly, R$^1$ and R$^3$ should be chosen to be any suitable moiety which allows this polymerization to proceed at an advantageous rate taking into account factors such as the chemical properties of R$^1$ and R$^3$ as well as steric properties. By the term chemical properties is meant not only the potential of Si—OR$^1$ and Si—OR$^3$ to undergo hydrolysis and therefore polymerize and liberate alkanol, but also consideration should be given to other chemicals present in the reaction system and an $R^1$ and $R^3$ group should be chosen which does not preferentially react with these other groups under the reaction conditions, thus avoiding polymerization.

Preferably, $R^1$ is chosen such that $R^1O$— is a good leaving group. By the term good leaving group, it is meant that the $R^1O$— group has good energetic stability when it has departed from the silicon atom to which it was bound.

Preferably, $R^3$ is chosen such that $R^3O$— is a good leaving group. By the term good leaving group, it is meant that the $R^3O$— group has good energetic stability when it has departed from the silicon atom to which it was bound.

Molecules having a pKa of less than or equal to 16, more preferably, less than or equal to 15, most preferably less than or equal to 14 (measured in $H_2O$ at 298K) may be considered as good leaving groups.

Preferably, $R^X$ is independently selected from any alkylene, alkenylene, alkynylene, aralkylene or arylene group, or any combination thereof. Preferably, $R^X$ is any $C_2$ to $C_6$ bivalent organic bridging group. Preferably, $R^X$ is selected from an ethylene group, a propylene group or a butylene group.

Preferably, Q is an Oxygen radical.

Preferably, $R^X$ comprises an H, alkyl, alkenyl, alkynyl, aralkyl or aryl group that is optionally substituted with one or more Oxygen or Sulphur atoms. Preferably, $R^Z$ comprises at least, one epoxy functional group. Preferably, $R^Z$ comprises at least one carbonyl functional group.

Preferably, each $R^W$ is independently selected from H, alkyl, alkenyl, alkynyl, aralkyl or aryl group. Preferably, each $R^W$ comprises a H radical, thus preferably, the group —N($R^W$)$_2$ may be an amino group. Preferably, at least one $R^2$ group comprises a terminal $NH_2$ group.

Preferably, at least one $R^2$ group comprises a terminal epoxy group. Preferably, at least one $R^2$ group comprises a terminal acrylate group.

The term "alk" or "alkyl", as used herein unless otherwise defined, relates to saturated hydrocarbon radicals being straight, branched, cyclic or polycyclic moieties or combinations thereof and contain 1 to 20 carbon atoms, preferably 1 to 10 carbon atoms, more preferably 1 to 8 carbon atoms, still more preferably 1 to 6 carbon atoms, yet more preferably 1 to 4 carbon atoms. These radicals may be optionally substituted with a chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, aryl or Het, wherein $R^{19}$ to $R^{27}$ each independently represent hydrogen, aryl or alkyl, and/or be interrupted by one or more oxygen or sulphur atoms, or by silano or dialkylsiloxane groups. Examples of such radicals may be independently selected from methyl, ethyl, n-propyl, isopropyl, n-butyl, isobutyl, sec-butyl, tert-butyl, 2-methylbutyl, pentyl, iso-amyl, hexyl, cyclohexyl, 3-methylpentyl, octyl and the like. The term "alkylene", as used herein, relates to a bivalent radical alkyl group as defined above. For example, an alkyl group such as methyl which would be represented as —$CH_3$, becomes methylene, —$CH_2$—, when represented as an alkylene. Other alkylene groups should be understood accordingly.

The term "alkenyl", as used herein, relates to hydrocarbon radicals having one or several, preferably up to 4, double bonds, being straight, branched, cyclic or polycyclic moieties or combinations thereof and containing from 2 to 18 carbon atoms, preferably 2 to 10 carbon atoms, more preferably from 2 to 8 carbon atoms, still more preferably 2 to 6 carbon atoms, yet more preferably 2 to 4 carbon atoms. These radicals may be optionally substituted with a hydroxyl, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, aryl or Het, wherein $R^{19}$ to $R^{27}$ each independently represent hydrogen, aryl or alkyl, and/or be interrupted by one or more oxygen or sulphur atoms, or by silano or dialkylsuloxane groups. Examples of such radicals may be independently selected from alkenyl groups include vinyl, allyl, isopropenyl, pentenyl, hexenyl, heptenyl, cyclopropenyl, cyclobutenyl, cyclopentenyl, cyclohexenyl, 1-propenyl, 2-butenyl, 2-methyl-2-butenyl, isoprenyl, farnesyl, geranyl, geranylgeranyl and the like. The term "alkenylene", as used herein, relates to a bivalent radical alkenyl group as defined above. For example, an alkenyl group such as ethenyl which would be represented as —CH=$CH_2$, becomes ethenylene, —CH=CH—, when represented as an alkenylene. Other alkenylene groups should be understood accordingly.

The term "alkynyl", as used herein, relates to hydrocarbon radicals having one or several, preferably up to 4, triple bonds, being straight, branched, cyclic or polycyclic moieties or combinations thereof and having from 2 to 18 carbon atoms, preferably 2 to 1.0 carbon atoms, more preferably from 2 to 8 carbon atoms, still more preferably from 2 to 6 carbon atoms, yet more preferably 2 to 4 carbon atoms. These radicals may be optionally substituted with a hydroxy, chloro, bromo, iodo, cyano, nitro, $OR^{19}$, $OC(O)R^{20}$, $C(O)R^{21}$, $C(O)OR^{22}$, $NR^{23}R^{24}$, $C(O) NR^{25}R^{26}$, $SR^{27}$, $C(O)SR^{27}$, $C(S)NR^{25}R^{26}$, aryl or Het, wherein $R^{19}$ to $R^{27}$ each independently represent hydrogen, aryl or lower alkyl, and/or be interrupted by one or more oxygen or sulphur atoms, or by silano or dialkylsiloxane groups. Examples of such radicals may be independently selected from alkynyl radicals include ethynyl, propynyl, propargyl, butynyl, pentynyl, hexynyl and the like. The term "alkynylene", as used herein, relates to a bivalent radical alkynyl group as defined above. For example, an alkynyl group such as ethynyl which would be represented as —C≡CH, becomes ethynylene, —C≡C—, when represented as an alkynylene. Other alkynylene groups should be understood accordingly.

The term "aryl" as used herein, relates to an organic radical derived from an aromatic hydrocarbon by removal of one hydrogen, and includes any monocyclic, bicyclic or polycyclic carbon ring of up to 7 members in each ring, wherein at least one ring is aromatic. These radicals may be optionally substituted with a hydroxy, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, aryl or Het, wherein $R^{19}$ to $R^{27}$ each independently represent hydrogen, aryl or lower alkyl, and/or be interrupted by one or more oxygen or sulphur atoms, or by silano or dialkylsilcon groups. Examples of such radicals may be independently selected from phenyl, p-tolyl, 4-methoxyphenyl, 4 (tert-butoxy)phenyl, 3-methyl-4-methoxyphenyl, 4-fluorophenyl, 4-chlorophenyl, 3-nitrophenyl, 3-aminophenyl, 3-acetamidophenyl, 4-acetamidophenyl, 2-methyl-3-acetamidophenyl, 2-methyl-3-aminophenyl, 3-methyl-4-aminophenyl, 2-amino-3-methylphenyl, 2,4-dimethyl-3-aminophenyl, 4-hydroxyphenyl, 3-methyl-4-hydroxyphenyl, 1-naphthyl, 2-naphthyl, 3-amino-1-naphthyl, 2-methyl-3-amino-1-naphthyl, 6-amino-2-naphthyl, 4,6-dimethoxy-2-naphthyl, tetrahydronaphthyl, indanyl, biphenyl, phenanthryl, anthryl or acenaphthyl and the like. The term "arylene", as used herein, relates to a bivalent radical aryl group as defined above. For example, an aryl group such as phenyl which would be represented as -Ph, becomes phenylene, -Ph-, when represented as an arylene. Other arylene groups should be understood accordingly.

The term "aralkyl" as used herein, relates to a group of the formula alkyl-aryl, in which alkyl and aryl have the same meaning as defined above and may be attached to an adjacent radical via the alkyl or aryl part thereof. Examples of such radicals may be independently selected from benzyl, phenethyl, dibenzylmethyl, methylphenylmethyl, 3-(2-naphthyl)-butyl, and the like. The term "aralkylene", as used herein, relates to a bivalent radical aralkyl group as defined above. For example, an aralkyl group such as benzyl which would be represented as -Bn, becomes benzylene, -Bn-, when represented as an aralkylene. Other aralkylene groups should be understood accordingly.

The term "Het", when used herein, includes four-to-twelve-membered, preferably four-to-ten-membered ring systems, which rings contain one or more heteroatoms selected from nitrogen, oxygen, sulphur and mixtures thereof, and which rings may contain one or more double bonds or be non-aromatic, partly aromatic or wholly aromatic in character. The ring systems may be monocyclic, bicyclic or fused. Each "Het" group identified herein is optionally substituted by one or more substituents selected from halo, cyano, nitro, oxo, lower alkyl (which alkyl group may itself be optionally substituted or terminated as defined below) $OR^{19}$, $OC(O)R^{25}$, $C(O)R^{21}$, $C(O)OR^{22}$, $NR^{23}R^{24}$, $C(O)NR^{25}R^{26}$, $SR^{27}$, $C(O)SR^{27}$ or $C(S)NR^{25}R^{26}$ wherein $R^{19}$ to $R^{27}$ each independently represent hydrogen, aryl or lower alkyl (which alkyl group itself may be optionally substituted or terminated as defined below). The term "Het" thus includes groups such as optionally substituted azetidinyl, pyrrolidinyl, imidazolyl, indolyl, furanyl, oxazolyl, isoxazolyl, oxadiazolyl, thiazolyl, thiadiazolyl, triazolyl, oxatriazolyl, thiatriazolyl, pyridazinyl, morpholinyl, pyrimidinyl, pyrazinyl, quinolinyl, isoquinolinyl, piperidinyl, pyrazolyl and piperazinyl. Substitution at Het may be at a carbon atom of the Het ring or, where appropriate, at one or more of the heteroatoms.

"Het" groups may also be in the form of an N oxide.

For the avoidance of doubt, the reference to alkyl, alkenyl, alkynyl, aryl or aralkyl in composite groups herein should be interpreted accordingly, for example the reference to alkyl in aminoalkyl or alk in alkoxyl should be interpreted as alk or alkyl above etc.

Preferably, each $R^1$ group is independently selected from hydrogen or any $C_1$ to $C_6$ alkyl group.

Examples of suitable $R^1$ groups include but are not restricted to any of the following: hydrogen, methyl, ethyl, propyl, iso-propyl, butyl, iso-butyl, sec-butyl, tert-butyl, pentyl, 2-methyl-pentyl, 3-methyl-pentyl, 4-methyl-pentyl, cyclopentyl, methyl-cyclopentyl, hexyl, cyclohexyl, formyl, acetyl, propionyl, butyryl, trifluoroacetyl. Preferably, each $R^1$ group is independently selected from hydrogen or any $C_1$ to $C_4$ alkyl group. More preferably, each $R^1$ is independently selected from hydrogen, methyl, ethyl, propyl or butyl groups. Most preferably, each R; is independently selected from either a methyl group or an ethyl group.

Preferably, each $R^4$ group is independently selected from any of: hydrogen, methyl, ethyl, propyl, iso-propyl, butyl, iso-butyl, sec-butyl or tertiary butyl group. In a particularly preferred embodiment, each $R^{33}$ group is independently selected from hydrogen, methyl or ethyl.

Preferably, each $R^5$ group is independently selected from any of: hydrogen, methyl, ethyl, propyl, iso-propyl, butyl, iso-butyl, sec-butyl or tertiary butyl group. In a particularly preferred embodiment, each $R^{33}$ group is independently selected from hydrogen, methyl or ethyl.

Preferably, each $R^3$ group is independently selected from hydrogen, or any $C_1$ to $C_6$ alkyl group. Examples of suitable $R^3$ groups include but are not restricted to hydrogen, methyl, ethyl, propyl, iso-propyl, butyl, iso-butyl, 2 methyl butyl, 3 methyl butyl, tertiary butyl, pentyl, 2 methyl pentyl, 3 methyl pentyl, 4 methyl pentyl, cyclopentyl, methyl cyclopentyl, hexyl, cyclohexyl. More preferably, each $R^3$ group is independently selected from hydrogen or any $C_1$ to $C_4$ alkyl group. More preferably, each $R^3$ group is independently selected from hydrogen, methyl, ethyl, propyl or butyl groups or branched variants thereof. Most preferably, each $R^3$ group is independently selected from either a methyl group or an ethyl group.

Examples of suitable $R^2$ groups include but are not restricted to: hydrogen, methyl, ethyl, propyl, isopropyl, butyl, isobutyl, tert-butyl, pentyl, cyclopentyl, hexyl, cyclohexyl, heptyl, octyl, vinyl, phenyl, 3-glycidyloxypropyl, 3,4-epoxycyclohexyl-ethyl, 3-methacryloyloxypropyl, acetoxy ethyl, acetoxy methyl, mercaptopropyl, alkyl amino.

Preferably, m=2 or 3. Most preferably, m=3.

Examples of suitable compounds having general structure I include, but are not restricted to, any of the following: tetra methyl silicate; tetra ethyl silicate; tetra propyl silicate; tetra butyl silicate; tetra pentyl silicate; tetra hexyl silicate; tetra iso-propyl silicate.

Examples of suitable compounds having general structure II that may be used include, but are not restricted to, any of the following: 3-(glycidyloxypropyl)-trimethoxysilane (CAS RN: [2530-83-8]), 3-(glycidyloxypropyl)-triethoxysilane (CAS RN: [2602-34-8]), 3-(glycidyloxypropyl)-methyldiethoxysilane (CAS RN: [2897-60-1], 2-(3,4-epoxycyclohexyl)-ethyltrimethoxysilane (CAS RN: [3388-04-3]), 2-(3,4-epoxycyclohexyl)-ethyltriethoxysilane (CAS RN: [10217-34-2]), 3-(methacryloyloxypropyl)-trimethoxysilane (CAS RN: [2530-85-0]), 3-(methacryloyloxypropyl)-triethoxysilane (CAS RN: [21142-229-0]), 3-(methacryloyloxypropyl)-methyldiethoxysilane (CAS RN: [65100-04-1]), 3-(acryloyloxypropyl)-triethoxysilane (CAS RN: [21142-29-0]), acetoxymethyltriethoxysilane (CAS RN: 5630-83-1), 3-mercaptopropyltriethoxysilane (CAS RN: 14814-09-6), 3-aminopropyltriethoxysilane (CAS 919-30-2).

In a particularly preferred embodiment, the oligomeric or polymeric substance is formed from at least one monomer of the general formula I, and at least one monomer of the general formula II, which at least one monomer of the general formula II comprises a terminal epoxy group or acrylate group.

Preferably, the oligomeric or polymeric substance is formed from 50 to 70% (by weight of the total monomer used to produce the oligomeric or polymeric substance) of at least one monomer of the general formula I. Preferably, the oligomeric or polymeric substance is formed from 55 to 65% (by weight of the total monomer used to produce the oligomeric or polymeric substance) of at least one monomer of the general formula I. Preferably, the oligomeric or polymeric substance is formed from about 60% (by weight of the total monomer used to produce the oligomeric or polymeric substance) of at least one monomer of the general formula I.

Preferably, the oligomeric or polymeric substance is formed from 30 to 50% (by weight of the total monomer used to produce the oligomeric or polymeric substance) of at least one monomer of general formula II. Preferably, the oligomeric or polymeric substance is further formed from 35 to 45% (by weight of the total monomer used to produce the oligomeric or polymeric substance) of at least one monomer of general formula II. Preferably, the oligomeric or polymeric substance is further formed from about 40% (by weight of the total monomer used to produce the oligomeric or polymeric substance) of at least one monomer of general formula II.

Preferably, the polymeric or oligomeric substance is formed from at least one monomers of the general formula I and at least one colloidal silica.

For the avoidance of doubt, the term "colloidal silica" as used herein refers to a colloidal suspension of silica that is preferably stabilised by one or more metal ion. The one or more metal ion may be $Li^-$ or $Na^+$, for example.

Preferably, the colloidal silica is present in the form of a water dispersion.

Preferably, the ratio (by weight) of monomer I:II:SiO2 (in the colloidal silica) is about 50-70:50-30:0.1-5. Preferably, the ratio (by weight) of monomer I:II:SiO2 (in the colloidal silica) is about 55-65:45-35:1-4. Most preferably, the ratio (by weight) of monomer I:II:SiO2 (in the colloidal silica) is about 58.5:39:2.5.

Examples of suitable colloidal silicas include Bidzil® CC30 (commercially available from Eka Chemicals), Kostrosol 0820 BS (commercially available from Chemiewerke Bad Kostritz)

Preferably, the oligomeric or polymeric substance is present in the aqueous binder composition between 1% and 99%, more preferably between 1% and 70% by dry weight of the binder composition. Preferably, the oligomeric or polymeric substance is present in the aqueous binder composition between 5 and 60% by dry weight of the binder composition. More preferably, the oligomeric or polymeric substance is present in the aqueous binder composition in an amount between 5% and 50% by dry weight of the binder composition, more preferably, the oligomeric or polymeric substance is present in the aqueous binder composition in an amount between 6% and 40% by dry weight of the binder composition, more preferably, the oligomeric or polymeric substance is present in the aqueous binder composition in an amount between 8% and 30% by dry weight of the binder composition, and most preferably, the oligomeric or polymeric substance is present in the aqueous binder composition in an amount between 15% and 20% by dry weight of the binder composition.

According to a third aspect of the present invention there is provided a method of preparing a paint composition, comprising contacting a first component with a second component, the first component comprising an aqueous binder, which aqueous binder comprises an oligomeric or polymeric compound the oligomeric or polymeric compound being formed from at least one monomer of the general formula I:

$$Si(OR^1)_4 \qquad\qquad I$$

where each $R^1$ is independently selected from hydrogen or any alkyl, alkenyl, alkynyl, aralkyl, aryl or $-(C=O)R^4$ group, and
each $R^4$ group is independently selected from hydrogen or any alkyl, alkenyl, alkynyl, aralkyl or aryl group,
and at least one monomer having the general formula II:

$$(R^2)_{4-m}Si(OR^3)_m \qquad\qquad II$$

where each $R^2$ is independently selected from hydrogen or any alkyl, alkenyl, alkynyl, aralkyl or aryl group, and wherein at least one $-R^2$ group comprises the group $-R^XQR^Z$ or $-R^XN(R^W)_2$ where $R^X$ is any $C_1$ to $C_{10}$ bivalent organic bridging group, Q is selected from an Oxygen or a Sulphur radical and $R^Z$ comprises an H, alkyl, alkenyl, alkynyl, aralkyl or aryl group, and each $R^W$ is independently selected and defined as for $R^Z$ above;
where each $R^3$ is independently selected from hydrogen or any alkyl, alkenyl, alkynyl, aralkyl, aryl or $-(C=O)R^5$ group, where $R^5$ is defined as for $R^4$ above,
and m=1 to 3;
and, optionally at least one colloidal silica;
the second component comprising a reactive filler material.

Preferably, the polymeric or oligomeric substance is formed from at least one monomer of the general formula II and at least one colloidal silica.

According to a fourth aspect of the present invention there is provided a paint composition, the paint composition comprising at least one reactive filler material and a binder, which binder comprises an oligomeric or polymeric material, the oligomeric or polymeric material being formed by the following process:
i) forming a reaction phase comprising at least one monomer of the general formula I:

$$Si(OR^1)_4 \qquad\qquad I$$

where each $R^1$ is independently selected from hydrogen or any alkyl, alkenyl, alkynyl, aralkyl, aryl or $-(C=O)R^4$ group, and
each $R^4$ group is independently selected from hydrogen or any alkyl, alkenyl, alkynyl, aralkyl or aryl group,
and at least one monomer having the general formula II:

$$(R^2)_{4-m}Si(OR^3)_m \qquad\qquad II$$

where each $R^2$ is independently selected from hydrogen or any alkyl, alkenyl, alkynyl, aralkyl or aryl group, and wherein at least one $R^2$ group comprises the group $-R^XQR^Z$ or $-R^XN(R^W)_2$ where $R^X$ is any $C_1$ to $C_{10}$ bivalent organic bridging group, Q is selected from an Oxygen or a Sulphur radical and $R^Z$ comprises an H, alkyl, alkenyl, alkynyl, aralkyl or aryl group, and each $R^W$ is independently selected and defined as for $R^Z$ above;
where each $R^3$ is independently selected from hydrogen or any alkyl, alkenyl, alkynyl, aralkyl, aryl or $-(C=O)R^5$ group, where $R^5$ is defined as for $R^4$ above,
and m=1 to 3;
and, optionally at least one colloidal silica;
ii) contacting the components of the reaction phase with an $R^3O-$ removal agent;
iii) reacting the components of the reaction phase to form an oligomer or polymer.

Preferably, the polymeric or oligomeric substance is formed from at least one monomer of the general formula II and at least one colloidal silica.

According to fifth aspect of the present invention there is provided a method of preparing a paint composition comprising contacting at least one reactive filler material and a binder, which binder comprises an oligomeric or polymeric material, the oligomeric or polymeric material being formed by the following process:
i) forming a reaction phase comprising at least one monomer of the general formula I:

$$Si(OR^1)_4 \qquad\qquad I$$

where each $R^1$ is independently selected from hydrogen or any alkyl, alkenyl, alkynyl, aralkyl, aryl or $-(C=O)R^4$ group, and
each $R^4$ group is independently selected from hydrogen or any alkyl, alkenyl, alkynyl, aralkyl or aryl group,
and at least one monomer having the general formula II:

$$(R^2)_{4-m}Si(OR^3)_m \qquad\qquad II$$

where each $R^2$ is independently selected from hydrogen or any alkyl, alkenyl, alkynyl, aralkyl or aryl group, and wherein at least one $-R^2$ group comprises the group $-R^XQR^Z$ or $-R^XN(R^W)_2$ where $R^X$ is any $C_1$ to $C_{10}$ bivalent organic bridging group, Q is selected from an Oxygen or a Sulphur radical and $R^Z$ comprises an H, alkyl, alkenyl, alkynyl, aralkyl or aryl group, and each $R^W$ is independently selected and defined as for $R^2$ above;
where each $R^3$ is independently selected from hydrogen or any alkyl, alkenyl, alkynyl, aralkyl, aryl or —(C═O)$R^5$ group, where $R^5$ is defined as for $R^4$ above,
and m=1 to 3;
and, optionally at least one colloidal silica;
ii) contacting the components of the reaction phase with an $R^3$O— removal agent;
iii) reacting the components of the reaction phase to form an oligomer or polymer.

Preferably, the polymeric or oligomeric substance is formed from at least one monomer of the general formula II and at least one colloidal silica.

In a preferred embodiment, step i) of the method of forming the oligomeric or polymeric material may be as follows:
i) forming a reaction phase comprising at least one monomer of the general formula I:

$$\text{Si}(OR^1)_4 \qquad \text{I}$$

where each $R^1$ is independently selected from hydrogen or any alkyl, alkenyl, alkynyl, aralkyl, aryl or —(C═O)$R^4$ group, and
each $R^4$ group is independently selected from hydrogen or any alkyl, alkenyl, alkynyl, aralkyl or aryl group,
and, optionally, at least one colloidal silica;
and at least one monomer having the general formula II:

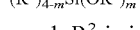
$$(R^2)_{4-m}\text{Si}(OR^3)_m \qquad \text{II}$$

where each $R^2$ is independently selected from hydrogen or any alkyl, alkenyl, alkynyl, aralkyl or aryl group, and wherein at least one —$R^2$ group comprises the group —$R^X QR^Z$ or —$R^X N(R^W)_2$ where $R^X$ is any $C_1$ to $C_{10}$ bivalent organic bridging group, Q is selected from an Oxygen or a Sulphur radical and $R^Z$ comprises an 1H, alkyl, alkenyl, alkynyl, aralkyl or aryl group, and each $R^W$ is independently selected and defined as for $R^Z$ above;
where each $R^3$ is independently selected from hydrogen or any alkyl, alkenyl, alkynyl, aralkyl, aryl or —(C═O)R group, where $R^5$ is defined as for $R^4$ above,
and m=1 to 3.

Preferably, the polymeric or oligomeric substance is formed from at least one monomer of the general formula I and at least one colloidal silica.

Preferably, the ratio (by weight) of the at least one monomer of general formula I:the at least one monomer of general formula II is in the range 1-99:99-1. More preferably, the ratio (by weight) of the at least one monomer of general formula I:the at least one monomer of general formula II is in the range 51-99:49-1

Preferably, the ratio (by weight) of monomer I:II is in the range 51-95:49-5. Preferably, the ratio (by weight) of monomer I:II is in the range 51-85:49-15. Preferably, the ratio (by weight) of monomer I:II is in the range 51-75:49-25. Preferably, the ratio (by weight) of monomer I:II is in the range 51-66:49-34. Preferably, the ratio (by weight) of monomer I:II is in the range 55-65:45-35. Most preferably, the ratio (by weight) of monomer I:II is about 60:40.

In a preferred embodiment, step ii) may be as follows:
ii) contacting the components of the reaction phase with an $R^1$O— removal agent and/or an $R^3$O— removal agent.

Preferably, the method of preparing an oligomeric or polymeric substance comprises the further step of removing the released alkanol, $R^4$COOH, $R^5$COOH and/or water.

Preferably, the released alkanol, $R^4$COOH, $R^5$COOH and/or water may be removed by any method, such as, for example, distillation.

In a preferred embodiment, the released alkanol, $R^4$COOH, $R^5$COOH and/or water is removed during step (iii) of the method. For example, the released alkanol, $R^4$COOH, $R^5$COOH and/or water may be removed (by distillation, for example) as it is produced in the reaction.

The removed alkanol $R^4$COOH, $R^5$COOH and/or water may be replaced by other components such as, for example, at least one acid.

Preferably, the $R^1$O— removal agent comprises water. Preferably, the $R^1$O— removal agent further comprises at least one alkanol. Preferably, the $R^1$O— removal agent comprises a mixture of water and at least one alkanol. Preferably, the at least one alkanol has a boiling point of less than 100° C. (measured at $10^5$ Pa pressure). Preferably, the at least one alkanol is any $C_1$ to $C_6$ alcohol. Preferably, the at least one alkanol is any $C_1$ to $C_6$ alcohol. Examples of suitable at least one alkanol include but are not restricted to methanol, ethanol, isopropanol, butanol and the like.

Preferably, the at least one alkanol is added together with the at least one monomer of the general formula I and the at least a second monomer having the general formula II, or alternatively, an at least one alkanol/water mixture may be added to the at least one monomer of the general formula I and the at least a second monomer having the general formula II. Preferably, the at least one alkanol is present in the reaction mixture in art amount between 1 to 40% by weight of the total weight of the at least one monomer of the general formula I and the at least a second monomer having the general formula II. More preferably, the at least one alkanol is present in the reaction mixture in an amount 5 to 25% by weight the at least one monomer of the general formula I and the at least a second monomer having the general formula II.

It should be appreciated by one skilled in the art that the above mentioned preferred features with respect to the $R^1$O— removal agent similarly apply to the $R^3$O— removal agent.

Preferably, step (ii) takes place at a temperature between 0° C. and 70° C. More preferably, step (ii) takes place at a temperature between 10° C. and 60° C. More preferably, step (ii) takes place at a temperature between 20° C. and 50° C. Most preferably, step (ii) takes place at a temperature between 30° C. and 40° C.

Preferably, the reaction of step (iii) takes place at a temperature between 0° C. and 90° C. More preferably, the reaction takes place at a temperature between 10° C. and 90° C. More preferably, the reaction takes place at a temperature between 40° C. and 90° C. Most preferably, the reaction takes place at a temperature between 80° C. and 90° C. Preferably, the reaction of step (iii) is performed in the presence of at least one catalyst.

Preferably, the catalyst comprises any suitable catalyst. Preferably the catalyst comprises a transition metal or group 14 or 15 chelate compound. Preferably, the catalyst comprises a transition metal or group 14 or 15 organic chelate compound. Preferably, the catalyst comprises a transition metal or group 14 or 15 alkoxy chelate compound. Preferably the catalyst is water soluble. More preferably, the catalyst comprises a transition metal or group 14 or 15 poly-alkoxy chelate compound. The catalyst may be stabilised by an alkanolamine derivative. Preferably, the catalyst is selected from compounds of any of the following: titanium, zirconium, hafnium, tin, antimony or germanium. In a particularly preferred embodiment, the catalyst comprises a water soluble alkoxy titanate, zirconate or stannate compound stabilised by an alkanolamine derivative. Most preferably, the catalyst comprises an alkoxy titanate compound.

Examples of suitable catalysts include TYZOR®, commercially available from DuPont, and VERTEC®, commercially available from Johnson Matthey.

Preferably, the reaction takes place at a suitable pH in a range to suit the stability of the binder.

Preferably, the reaction takes place in the presence of a pH adjuster operable to adjust the pH of the reaction mixture. Preferably, the pH adjuster comprises at least one acid.

Preferably, the pH adjuster is present in the reaction in an amount sufficient to adjust the pH of the reaction mixture to between 6 and 1, more preferably, between 5 and 1, and most preferably, between 4 and 1.5.

In one embodiment, the pH adjuster may comprise the acid $R^4COOH$ generated during the reaction.

Alternatively or additionally, the pH adjuster may comprise the acid $R^5COOH$ generated during the reaction.

Preferably, the at least one acid is any suitable organic or inorganic acid. Preferably, the at least one acid has a pKa in aqueous solution at 298K of less than 5, more preferably, less than 4.

Preferably, the pH adjuster is a strong BrØnsted acid. By strong BrØnsted acid is meant a BrØnsted acid having a pKa (in aqueous solution at 298K) between −12 and −5, and preferably between −10 and −6.

Alternatively or additionally, the pH adjuster may be a weak BrØnsted acid. By weak BrØnsted acid it is meant a BrØnsted acid having a pKa (in aqueous solution at 298K) between −5 and +10, and preferably between +3 and +5.

Preferably, the at least one acid is water soluble.

Preferably, the at least one acid comprises any $C_1$-$C_{10}$ organic acid, more preferably, any $C_1$-$C_6$ organic acid. Preferably, the at least one acid comprises any lower alkyl acid.

Examples of suitable at least one acids include but are not restricted to any of the following, alone or in combination: formic, acetic, propionic, butyric, oxalic, malonic, succinic, glutaric, adipic, citric, hydrochloric, sulphuric, phosphoric, nitric, boric, trifluoroacetic, methanesulfonic, trifluoro methanesulfonic acid.

The at least one acid may alternatively or additionally comprise at least one water stable Lewis acid. Examples of suitable Lewis acids include but are not restricted to LiCl, $FeCl_3$, $ZnCl_2$, $CaCl_2$ and the like.

References herein to pH should be regarded as pH measured at 298K in aqueous solution.

The components of the third and fourth aspect of the invention may be contacted in any order. For instance, the at least one acid may be firstly introduced to the silanes and then later to the water or the water/at least one alkanol mixture or, alternatively, the silanes, the at least one acid and the water or water/at least one alkanol mixture may all be introduced at the same time. Beneficial results may be achieved by adding different amounts of the at least one acid at different stages of the polymerization reaction.

Additives or stabilising agents may also be introduced during the preparation of the binder. Examples of such include but are not restricted to colloidal silica, silica sols, antifoaming agents or buffers.

One embodiment of the method includes adding the $R^1O$— and/or $R^3O$— removal agent to the other ingredients. In an alternate embodiment, the reaction phase and other agents, if any, are added to the $R^1O$— and/or $R^3O$— removal agent. In a further alternate embodiment, a fraction of the reaction phase is mixed with the $R^1O$— and/or $R^3O$— removal agent and then added to the rest of the ingredients.

The removal of alkanol, $R^4COOH$, $R^5COOH$ and/or water may be performed at atmospheric pressure or under vacuum. The removal may start during the mixing stage as well as after completion of hydrolysis of the silanes. The evolution of hydrolysis of silanes may be monitored by any conventional analytical method such as gas chromatography, infra-red spectroscopy, Raman spectroscopy or nuclear magnetic resonance.

The amount of removed alkanol, $R^4COOH$, $R^5COOH$ and/or water may be determined by any suitable analytical method.

The amount of $R^1O$— and/or $R^3O$— removal agent used in the polymerization reaction may be adjusted in order to reach a desired final solids amount after the distillation process. The weight of the alkanols may be replaced by the same weight in $R^1O$— and/or $R^3O$— removal agent during the process or, preferably, substantially after completion of the process.

The paint may be any water based silicone decorative or protective paint such as water repellent, dirt repellent paint for concrete and facades, impregnation agents for indoor or outdoor walls, water repellent agents for textiles. Preferably, the paint is an anticorrosion paint. Preferably, the paint is a primer, more preferably a shop primer. In an especially preferred embodiment, the paint is a weldable shop primer.

According to a sixth aspect of the present invention there is provided a two component paint composition comprising:
  i) a first component comprising an aqueous binder composition as defined in any of the above aspects of invention; and
  ii) a second component comprising at least one reactive filler.

The two component paint composition may further comprise one or more of the following in either component: non conductive pigments, thickeners, rheological additives, colloidal silica, coated colloidal silica and/or at least one silica sol. Preferably, the first component further comprises one or more of the following: non-conductive pigments, thickeners, rheological additives, colloidal silica, coated colloidal silica or silica sol.

Examples of suitable non conductive pigments include titanium dioxide, red iron oxide, calcium carbonate, talc, aluminium silicate and yellow iron oxide.

Preferably, the two component paint composition comprises at least one filler. Preferably, the second component is a powder. Preferably, the at least one filler is present in the second component, preferably in an amount between 1 and 99% of the dry weight of the second component. More preferably, the at least one filler is present in the second component in an amount between 20 and 80% of the dry weight of the second component. More preferably, the at least one filler is present in the second component in an amount between 30 and 60% of the dry weight of the second component. Most preferably, the at least one filler is present in the second component in an amount between 40 and 50% of the dry weight of the second component.

Preferably, the at least one filler comprises a mineral filler.

Preferably, the at least one filler comprises one or more of the following: iron oxides (other than micaceous iron oxide); natural and precipitated barium sulphate, barytes, blanc fixe; aluminium silicate, kaolin, kaolinite, china clay; magnesium silicate and magnesium hydrosilicate, mica, talc, chlorite, tremolite; silica, surface treated silica, amorphous quartz, crystalline quartz, fumed silica; aluminium oxide and hydrate, bauxite, calcined bauxite; calcium magnesium carbonate, dolomite; natural and precipitated calcium carbonate; aluminium silicates, feldspar; nepheline syenite; calcium silicates, wollasionite; zinc oxide; zinc phosphate; graphite; bismuth vanadate; lead chromate; silicium carbide; zeolites; pyrophyllite; glass flakes; iron phosphide; nickel phosphide; hollow spheres; and aluminium. Also possible are other families of sulphates, carbonates, silicates, oxides and vanadates.

Preferably, the second component comprises zinc. Preferably, the zinc is present as finely divided zinc, zinc flake, zinc powder or zinc dust. Preferably, the zinc is present in the second component in an amount 1 to 99% of the dry weight of the second component. More preferably, the zinc is present in the second component in an amount 20 to 80% of the dry weight of the second component. More preferably, the zinc is present in the second component in an amount 30 to 60% of the dry weight of the second component. Most preferably, the zinc is present in the second component in an amount 40 to 50% of the dry weight of the second component.

Preferably, the two component paint composition comprises a colour pigment. Preferably, the colour pigment is present in either the first or second component in an amount 0.1 to 50% of the dry weight of whichever component it is present in. More preferably, the colour pigment is present in either the first or second component in an amount 1 to 15% of the dry weight of whichever component it is present in.

Preferably, the second component comprises a conductive pigment. Conductive pigments are known to improve both anti-corrosive properties (by electrically connecting zinc particles with the substrate) and arc welding properties. Preferably, the conductive pigment is selected from micaceous iron oxide, ferro alloy, di-iron phosphide, copper flakes, nickel flakes stainless steel flakes, aluminium flakes and the like. Preferably, the conductive pigment is present in the second component in an amount 60 to 20% of the dry weight of the second component. More preferably, the conductive pigment is present in the second component in an amount 40 to 25% of the dry weight of the second component.

Optionally, the two component paint composition may further comprise suitable additives such as anti-settling, defoamers, thickening agents, rust inhibitor or wetting agents.

Typical thickening agents are acrylate polymers or hydroxyethyl cellulose polymers; when used they are preferably added in an amount up to 2% w/w of the dry weight of the two component paint composition, more preferably, up to 1% w/w of the dry weight of the two component paint composition. Typical anti settling agents are clay type materials like bentonite, glycerol trihydroxystearate, polyamides or polyethylene wax; when used they are preferably added in an amount up to 4% w/w of the dry weight of the two component paint composition, more preferably up to 2% w/w of the dry weight of the two component paint composition. Typical wetting agents are ethoxylated alkanols (e.g. the product with CAS RN=68439-45-2).

Optionally, the two component paint composition may further comprise suitable anti-corrosive pigments, such as molybdates, phosphates, borates or zinc oxide.

Optionally, the two component paint composition may further comprise suitable catalysts. Preferably, the catalyst comprises a transition metal or group 14 or 15 chelate compound. Preferably, the catalyst comprises a transition metal or group 14 or 15 organic chelate compound. Preferably, the catalyst comprises a transition metal or group 14 or 15 alkoxy chelate compound. Preferably the catalyst is water soluble. More preferably, the catalyst comprises a transition metal or group 14 or 15 poly-alkoxy chelate compound. The catalyst may be stabilised by an alkanolamine derivative. Preferably, the catalyst is selected from compounds of any of the following: titanium, zirconium, hafnium, tin, antimony or germanium. In a particularly preferred embodiment, the catalyst comprises a water soluble alkoxy titanate, zirconate or stannate compound stabilised by an alkanolamine derivative. Most preferably, the catalyst comprises an alkoxy titanate compound.

Examples of suitable catalysts include but are not restricted to TYZOR LA®, commercially available from DuPont, or VERTEC XL175®, commercially available from Johnson Matthey.

Preferably, the mixing ratio, by weight of the components, between the first and the second component lies between 1:20 and 1:0.05, more preferably, between 1:10 and 1:0.1, most preferably, between 1:2 and 1:0.1.

The two components of the two component paint composition are preferably introduced to each other substantially immediately prior to application of the paint composition to the substrate; preferably, less than 2 hours before application, more preferably, less than 1 hour before application, most preferably, less than 30 minutes before application. The two components are preferably mixed together prior to use.

Preferably, the percentage w/w solids of the two component paint composition are between 70% and 10%, more preferably, between 40% and 20%, and most preferably between 35% and 25%.

Preferably, after the two part paint composition is applied to a substrate it cures to form a dry film. Preferably, zinc dust is present in the dry film between 80% and 1%, more preferably between 60% and 20%, and most preferably between 50% and 30% by weight of the dry film.

According to a seventh aspect of the present invention there is provided a coating derived from a paint composition of any of the first, second, fourth or sixth aspect.

According to an eighth aspect of the present invention there is provided a substrate comprising at least one coating layer, the coating layer being derived from a paint composition of any of the first, second, fourth or sixth aspect.

All of the features disclosed herein may be combined with any of the above aspects and in any combination.

EXAMPLES

Binder 1

91 g of 3-glycidyloxypropyl trimethoxysilane, 136.6 g of tetraethylsilicate are stirred. 662.5 g of water containing 2.3 g of formic acid is then drop wise added during a period of 30 min while the temperature is maintained below 35° C. At the end of the addition, the temperature is raised to 85° C. for 15 min and is then raised to maintain the distillation of the mixture of methanol and ethanol, the distillation is stopped when the temperature reaches 99° C. For indication, a volume of ca. 267 ml is collected in the distillation trap leading to weight solids of the binder of c.a. 17.5%.

Binder 2

80.2 g of 3-glycidyloxypropyl trimethoxysilane, 120.3 g of tetraethylsilicate and are stirred. 629.8 g of water containing 2.2 g of formic acid and 17.16 g of Bindzil CC30 is then drop wise added during a period of 30 min while the temperature is maintained below 35° C. At the end of the addition, the temperature is raised to 85° C. for 45 min and is then raised until distillation of the mixture or methanol and ethanol, the distillation is stopped when the temperature of the reactor reaches 100° C. For indication, a volume of ca. 241 ml is collected in the distillation trap leading to weight solids of the binder of c.a. 17.0%.

The used silanes are commercially available from Degussa AG.

The following examples are of paint formulations. The paint formulations are prepared by adding the filler mixture to the aqueous binder and then stirred by hand.

| Example | Binder#* | Binder weight/r* | Westmin D30E* | Nyad M1250* | Zinc dust Larvik standard grade 7* | Miox* | Zinc oxide LF* |
|---------|----------|------------------|---------------|-------------|-------------------------------------|-------|----------------|
| 1 | 1 | 40.9 | — | 13.1 | 28.2 | 11.8 | 6 |
| 2 | 1 | 44.4 | 50.2 | — | — | — | 5.4 |
| 3 | 1 | 55.5 | — | 37.7 | — | — | 6.8 |
| 4 | 2 | 40.9 | — | 13.1 | 28.2 | 11.8 | 6 |
| 5 | 2 | 44.4 | 50.2 | — | — | — | 5.4 |
| 6 | 2 | 55.5 | — | 37.7 | — | — | 6.8 |

*Relative weights in grams

Westmin D30E is commercially available from Mondo Minerals, Nyad M1250 is commercially available from Nyco Minerals, Zinc dust standard 7 and Zinc Oxide LF are commercially available from Umicore and Miox is a generic abbreviation for Micaceous Iron Oxide available from Kärtner.

Film Properties.

| Example | Water double rubs | Pot life (hours)* |
|---------|-------------------|-------------------|
| 1 | >200 after 24 hours | 6 |
| 2 | 60 after 24 hours | >7 |
| 3 | >200 after 6 hours | 3 |
| 4 | >200 after 24 hours | 6 |
| 5 | 90 after 24 hours | >7 |
| 6 | >200 after 6 hours | 3 |

*The pot life represents the time during which the viscosity remains low enough to allow application by the means of airless spraying.

The water double rubs are measured by rubbing with light pressure a wet cotton cloth back and forth on the coating. If >200 rubs are obtained, we can say that the coating is appropriately cured. When the coating is easily wiped away from the substrate, we can say that the coating is not cured (cf. Test method ASTM D4752 where 50 double rubs with Methyl Ethyl Ketone indicate sufficient curing).

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A two component paint composition that, after mixing, comprises the following components in aqueous solution:

a) a first component comprising:
i) an aqueous binder, which aqueous binder comprises an oligomeric or polymeric compound the oligomeric or polymeric compound being formed from at least one monomer of the general formula I:

$$Si(OR^1)_4 \quad \quad I$$

where each $R^1$ is independently selected from hydrogen or any alkyl, alkenyl, alkynyl, aralkyl, aryl or —(C=O)$R^4$ group, and
each $R^4$ group is independently selected from hydrogen or any alkyl, alkenyl, alkynyl, aralkyl or aryl group,
and at least one monomer having the general formula II:

$$(R^2)_{4-m}Si(OR^3)_m \quad \quad II$$

where each $R^2$ is independently selected from hydrogen or any alkyl, alkenyl, alkynyl, aralkyl or aryl group, and wherein at least one —$R^2$ group comprises the group —$R^XQR^Z$ or —$R^XN(R^W)_2$ where $R^X$ is any $C_1$ to $C_{10}$ bivalent organic bridging group, Q is selected from an Oxygen or a Sulphur and $R^Z$ comprises an H, alkyl, alkenyl, alkynyl, aralkyl or aryl group, wherein $R^Z$ optionally comprises at least one epoxy functional group or at least one carbonyl functional group, and each $R^W$ is independently selected and defined as for $R^Z$ above;
where each $R^3$ is independently selected from hydrogen or any alkyl, alkenyl, alkynyl, aralkyl, or —(C=O)$R^5$ group, where $R^5$ is defined as for $R^4$ above,
and m=1 to 3;
and, optionally at least one colloidal silica;
b) a second component comprising:
i) at least one reactive filler material, the reactive material comprising zinc oxide;
provided that the paint composition comprises less than 20% by weight of or panic solvent.

2. A paint composition comprising: (i) an aqueous binder, which aqueous binder comprises an oligomeric or polymeric compound the oligomeric or polymeric compound being formed from at least one monomer of the general formula I:

$$Si(OR^1)_4 \quad \quad I$$

where each $R^1$ is independently selected from hydrogen or any alkyl, alkenyl, alkynyl, aralkyl, aryl or —(C=O)$R^4$ group, and
each $R^4$ group is independently selected from hydrogen or any alkyl, alkenyl, alkynyl, aralkyl or aryl group,
and at least one monomer having the general formula II:

$$(R^2)_{4-m}Si(OR^3)_m \quad \quad II$$

where each $R^2$ is independently selected from hydrogen or any alkyl, alkenyl, alkynyl, aralkyl or aryl group, and wherein at least one —$R^2$ group comprises the group —$R^X QR^Z$ or —$R^X N(R^W)_2$ where $R^X$ is any $C_1$ to $C_{10}$ bivalent organic bridging group, Q is selected from an Oxygen or a Sulphur and $R^Z$ comprises an H, alkyl, alkenyl, alkynyl, aralkyl or aryl group, wherein $R^Z$ optionally comprises at least one epoxy functional group or at least one carbonyl functional group, and each $R^W$ is independently selected and defined as for $R^Z$ above;

where each $R^3$ is independently selected from hydrogen or any alkyl, alkenyl, alkynyl, aralkyl, aryl or —$(C=O)R^5$ group, where $R^5$ is defined as for $R^4$ above, and m=1 to 3;

and, optionally at least one colloidal silica;

and (ii) at least one reactive filler material, wherein the reactive filler material comprises zinc oxide;

provided that the paint composition comprises less than 20% by weight of organic solvent.

3. A paint composition according to claim 1 or claim 2, wherein at least one $R^2$ group comprises a terminal epoxy group.

4. A paint composition according to claim 1 or claim 2, wherein at least one $R^2$ group comprises a terminal acrylate group.

5. A paint composition according to claim 1 or claim 2, wherein the monomer of general formula II is selected from one or more of the following: 3-glycidyloxypropyltrimethoxysilane, 3-glycidyloxypropyltriethoxysilane, 3-methacryloyloxypropyltrimethoxysilane, 3-methacryloyloxypropyltriethoxysilane.

6. A paint composition according to claim 2, wherein the monomer of general formula I is selected from tetra(methoxy)silane or tetra(ethoxy)silane.

7. A paint composition according to claim 1 or claim 2, wherein the oligomeric or polymeric substance is present in the aqueous binder between 99% and 1% by dry weight of the binder composition.

8. A method of preparing a paint composition, comprising contacting a first component with a second component, the first component comprising an aqueous binder, which aqueous binder comprises an oligomeric or polymeric compound the oligomeric or polymeric compound being formed from at least one monomer of the general formula I:

$$Si(OR^1)_4 \qquad \text{I}$$

where each $R^1$ is independently selected from hydrogen or any alkyl, alkenyl, alkynyl, aralkyl, aryl or —$(C=O)R^4$ group, and each $R^4$ group is independently selected from hydrogen or any alkyl, alkenyl, alkynyl, aralkyl or aryl group, and at least one monomer having the general formula II:

$$(R^2)_{4-m}Si(OR^3)_m \qquad \text{II}$$

where each $R^2$ is independently selected from hydrogen or any alkyl, alkenyl, alkynyl, aralkyl or aryl group, and wherein at least one —$R^2$ group comprises the group —$R^X QR^Z$ or —$R^X N(R^W)_2$ where $R^X$ is any $C_1$ to $C_{10}$ bivalent organic bridging group, Q is selected from an Oxygen or a Sulphur and $R^Z$ comprises an H, alkyl, alkenyl, alkynyl, aralkyl or aryl group, wherein $R^Z$ optionally comprises at least one epoxy functional group or at least one carbonyl functional group, and each $R^W$ is independently selected and defined as for $R^Z$ above;

where each $R^3$ is independently selected from hydrogen or any alkyl, alkenyl, alkynyl, aralkyl, aryl or —$(C=O)R^5$ group, where $R^5$ is defined as for $R^4$ above, and m=1 to 3;

and, optionally at least one colloidal silica; and the second component comprising a reactive filler material, the reactive filler material comprising zinc oxide provided that the paint composition comprises less than 20% by weight of organic solvent.

9. A paint composition, the paint composition comprising at least one reactive filler material and an aqueous binder, wherein the reactive filler material comprises zinc oxide, and wherein the binder comprises an oligomeric or polymeric material, the oligomeric or polymeric material being formed by the following process:

i) forming a reaction phase comprising at least one monomer of the general formula I:

$$Si(OR^1)_4 \qquad \text{I}$$

where each $R_1$ is independently selected from hydrogen or any alkyl, alkenyl, alkynyl, aralkyl, aryl or —$(C=O)R^4$ group, and each $R^4$ group is independently selected from hydrogen or any alkyl, alkenyl, alkynyl, aralkyl or aryl group, and at least one monomer having the general formula II:

$$(R^2)_{4-m}Si(OR^3)_m \qquad \text{II}$$

where each $R^2$ is independently selected from hydrogen or any alkyl, alkenyl, alkynyl, aralkyl or aryl group, and wherein at least one —$R^2$ group comprises the group —$R^X QR^Z$ or —$R^X N(R^W)_2$ where $R^X$ is any $C_1$ to $C_{10}$ bivalent organic bridging group, Q is selected from an Oxygen or a Sulphur and $R^Z$ comprises an H, alkyl, alkenyl, alkynyl, aralkyl or aryl group, wherein $R^Z$ optionally comprises at least one epoxy functional group or at least one carbonyl functional group, and each $R^W$ is independently selected and defined as for $R^Z$ above;

where each $R^3$ is independently selected from hydrogen or any alkyl, alkenyl, alkynyl, aralkyl, aryl or —$(C=O)R^5$ group, where $R^5$ is defined as for $R^4$ above, and m=1 to 3;

and, optionally at least one colloidal silica;

ii) contacting the components of the reaction phase with an $R^3O$— removal agent; and iii) reacting the components of the reaction phase to form an oligomer or polymer;

provided that the paint composition comprises less than 20% by weight of organic solvent.

10. A method of preparing a paint composition comprising contacting at least one reactive filler material and an aqueous binder, wherein the reactive filler material comprises zinc oxide, and wherein the binder comprises an oligomeric or polymeric material, the oligomeric or polymeric material being formed by the following process:

i) forming a reaction phase comprising at least one monomer of the general formula II:

$$Si(OR^1)_4 \qquad \text{I}$$

where each $R^1$ is independently selected from hydrogen or any alkyl, alkenyl, alkynyl, aralkyl, aryl or —$(C=O)R^4$ group, and each $R^4$ group is independently selected from hydrogen or any alkyl, alkenyl, alkynyl, aralkyl or aryl group, and at least one monomer having the general formula II:

$$(R^2)_{4-m}Si(OR^3)_m \qquad \text{II}$$

where each $R^2$ is independently selected from hydrogen or any alkyl, alkenyl, alkynyl, aralkyl or aryl group, and wherein at least one —$R^2$ group comprises the group —$R^X QR^Z$ or —$R^X N(R^W)_2$ where $R^X$ is any $C_1$ to $C_{10}$ bivalent organic bridging group, Q is selected from an Oxygen or a Sulphur and $R^Z$ comprises an H, alkyl, alkenyl, alkynyl, aralkyl or aryl group, wherein $R^Z$ optionally comprises at least one epoxy functional group or at least one carbonyl functional group, and each $R^W$ is independently selected and defined as for $R^Z$ above:

where each $R^3$ is independently selected from hydrogen or any alkyl, alkenyl, alkynyl, aralkyl, aryl or —(C=O)$R^5$ group, where $R^5$ is defined as for $R^4$ above, and m=1 to 3;

and, optionally at least one colloidal silica;

ii) contacting the components of the reaction phase with an $R^3O$— removal agent; and iii) reacting the components of the reaction phase to form an oligomer or polymer;

provided that the paint composition comprises less than 20% by weight of organic solvent.

11. A method according to claim 10, wherein the process for forming the oligomeric or polymeric material comprises the further step of removal of the released alkanol, $R^4COOH$, $R^5COOH$ and/or water.

12. A method according to claim 10 or claim 11, wherein the reaction takes place in the presence of a pH adjuster operable to adjust the pH of the reaction mixture to between 6 and 1.

13. A method according to claim 12, wherein the pH adjuster comprises the acid $R^4COOH$ or $R^5COOH$ generated during the reaction.

14. A paint composition according to claim 1, 2 or 9, wherein the paint composition is a weldable shop primer.

15. A paint composition prepared by the method of claim 8.

* * * * *

UNITED STATES PATENT AND TRADEMARK OFFICE
CERTIFICATE OF CORRECTION

| | | |
|---|---|---|
| PATENT NO. | : 8,129,028 B2 | |
| APPLICATION NO. | : 12/307227 | |
| DATED | : March 6, 2012 | |
| INVENTOR(S) | : Mark Plehiers et al. | |

It is certified that error appears in the above-identified patent and that said Letters Patent is hereby corrected as shown below:

In column 18, claim 1, line 53,

"20% by weight of or panic solvent." should read "20% by weight of organic solvent."

Signed and Sealed this
Eighteenth Day of December, 2012

David J. Kappos
*Director of the United States Patent and Trademark Office*